Patented May 24, 1949

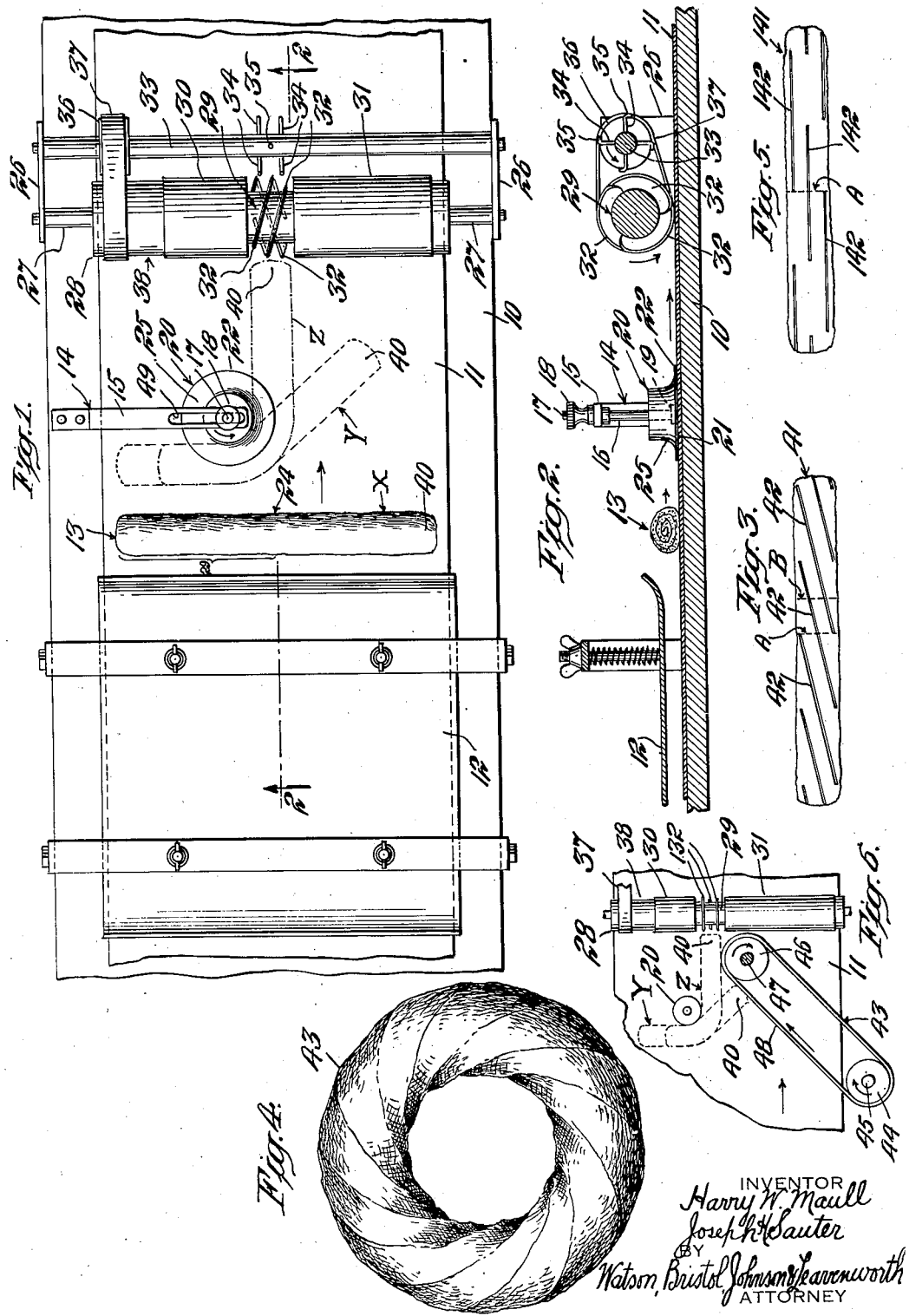

2,471,112

UNITED STATES PATENT OFFICE 2,471,112

DOUGH HANDLING MACHINE

Harry W. Maull, Maplewood, and Joseph H. Sauter, Rutherford, N. J., assignors to General Baking Company, New York, N. Y., a corporation of New York Application August 24, 1945, Serial No. 612,418

20 Claims. (Cl. 107—4)

The present invention relates to dough handling machinery and, more particularly, to such mechanism adapted for slashing and/or orienting elongated rolls of dough, e. g., dough for bakery products adapted for human consumption, such as coffee rings.

A general object of the present invention is the provision in such machinery of efficient and automatic means for forming slashes, preferably staggered, along elongated rolls of dough, and preferably extending substantially through the rolls from the top of the bottom sides thereof, as the rolls are moved along end on, which eliminates the necessity of manually performing such operations as is now common practice in making cinnamon coffee rings, thereby conserving man power and economizing in production in that such manual operations are time consuming and require skill, and in doing so accomplish the desired ends with precision frequently absent in present commercial procedures; and simple and effective means of orienting such rolls to end on positions as they are fed forward in transverse arrangement which may be dictated by apparatus and methods of handling for producing the elongated rolls characterized by certain desired features.

A more specific object of the invention is to provide such machinery characterized by means to move an elongated roll of dough forward in end on position to beneath rotatable slashing means to form a plurality of slashes, preferably staggered, along the dough roll as the latter is carried forward.

Another object of the invention is to provide in such machinery such slashing means which will be automatically operated when the dough carrying means is operated, and with the former preferably being driven from the latter.

A further object of the invention is the provision of means associated with such rotatable slashing means which will efficiently prevent in a simple manner a dough roll slashed thereby from sticking to the slashing means to be carried around therewith as the latter is rotated.

Still another object of the invention is the provision of means in the path of an elongated roll of dough being moved forward transversely of its path of movement which will automatically in a simple manner cause the dough roll to be oriented to be thereafter moved forward end on.

And a further object of the invention is to provide structural embodiments of the device which are readily constructed and allow efficient use and operation thereof.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawing, in which:

Fig. 1 is a top plan view, with parts broken away, of apparatus embodying a form of the invention, depicting it in operation;

Fig. 2 is a sectional view taken on line 2—2 of Fig. 1;

Fig. 3 is a plan view of a product resulting from operation of the apparatus shown in Figs. 1 and 2;

Fig. 4 is an enlarged plan view of a cinnamon coffee ring resulting from the baking of a ring of dough which may be formed by twisting the slashed elongated dough roll shown in Fig. 3 and then curling it into C-shape and squeezing the ends together.

Fig. 5 is a view similar to Fig. 3 of a modified form of product resulting from operation of apparatus similar to that shown in Figs. 1 and 2 but with slashing knives arranged somewhat differently; and Fig. 6 is a small plan view, with parts broken away, of apparatus somewhat similar to that shown in Figs. 1 and 2 but with the addition of certain roll orienting means.

Prior to the present invention it has generally been the practice in commercial production of a certain bakery product known as "coffee ring" to perform at least most of the following or comparable steps manually. A piece of aged dough is floured and rolled out into a large flat sheet which may resemble a pancake. This sheet of dough is then coated on its top surface with melted butter or other similar material and then sprinkled or spread with sugar and cinnamon or other flavoring materials. The sheet of dough so topped is then folded and rolled or coiled to form an elongated roll which may be about one and one-half feet (1½ ft.) long, more or less, and two or three inches (2-3 in.), more or less, in diameter. Some bakers so provide quite long elongated rolls and then transversely cut them up into subsections of such dimensions, while others start with smaller pieces of dough so that each piece will provide an elongated roll of about that length. A skilled operator then, with a scraper (which is a thin flat substantially rectangular piece of metal having a sharp edge on one side and a hand grip on the opposite side) or with a knife, forms a plurality of cuts or slashes either longitudinally along or diagonally across the elongated roll. The operator forms these slashes deeply into the roll either entirely down through it or through a number of the laminations formed by the folding and rolling or coiling. He then lays his hands on the opposite ends of the roll as it rests upon a table surface, and twists it about its axis by rolling away from himself with one hand and toward himself with the other hand. The slashed and twisted elongated roll is then curled around into C-shape, and the two ends brought to engagement and joined together. The resultant ring, with inner plies exposed through the cuts or slashes by the twisting, is then baked to produce a product which is quite familiar to the consumer public. Such procedure requires a high degree of skill on the part of the operator, particularly if any speed of output is to be attained. Even with the most highly skilled operators, the procedure is quite time consuming and production is slow. These and other difficulties of prior art practices are efficiently minimized or eliminated by employment of apparatus of the present invention.

An embodiment of the present invention is shown by way of example in the attached drawing wherein like numerals identify like parts throughout. A support 10 may comprise an elongated table top which has at the input end, such as at the left end of the structure shown in Figs. 1 and 2, means to roll out a lump of dough into flat pancake shape and deliver it upon the receiving end of the upward run of an endless belt 11 traveling, from left to right in Figs. 1 and 2, above the table top 10. The top surface of the flat pancake of dough may then be spread with butter or the like and/or suitably sprinkled with cinnamon and sugar and coiled and worked into elongated roll form by any suitable means, which may include a presser plate 12 beneath which the roll of dough, when extending transversely of the belt 11, is rolled as it is carried forward by upward run of the belt and, as a result, properly elongated. The resultant elongated roll of dough, which may be similar to that shown at 13 in Figs. 1 and 2, will be positioned transversely of the belt 11 and will comprise a spiraled structure with each turn of the spiral constituting a ply or lamination of dough and with topping material such as cinnamon and sugar interposed between the successive plies or laminations. The elongated dough roll 13 will then be carried forward to the structure of the present invention.

In accordance with the present invention the table top 10 may support a bracket 14 having an arm 15 located above the upward run of the belt 11 and extending toward, but short of the center line thereof. The end of the arm 15 near the center line of the belt 11 supports above the latter a shaft 16 which may have a reduced threaded end 17 engaged by a retaining nut 18 and a head 19, shown in dotted lines in Fig. 2. A grooved roller or idler 20 is mounted upon the shaft 16 for free rotation and held with its bottom end 21 spaced slightly above the upper surface of the belt 11 to permit free passage of the latter under the roller. A flange 22 is preferably formed on the bottom end 21 of the roller 20 to tend to lift at least the nearest portion of the dough roll 13 from the belt surface as the dough roll contacts the roller, and the latter in being carried forward by the belt is permitted to travel forward past the shaft 16 by the free rotational mount of the roller. It will be understood, however, that the roller, if desired, may be of other suitable shapes. It will be noted that the axis of the roller 20 is arranged substantially normal to the top surface of the upward run of the belt 11.

As indicated in Fig. 1, the roller is positioned to one side of the path 23 of the middle portion at 24 of the dough roll 13, and preferably at a point so that the distance between path 23 and the curved surface 25 of the roller 20 at the line of contact in a plane about half the depth of the roll is about one-half the width of the dough roll so as in action to orient the dough roll longitudinally of the belt substantially along its center line, as will be more fully hereinafter explained.

Beyond the orienting roller 20 the table 10 rotatably supports by means of side plates 26, 26 a pair of stub shafts 27, 27 which carry therebetween a cylindrical roller 28 extending transversely of and above the upward run of the belt 11. The roller 28 which constitutes a portion of the slashing means has a central section 29 at least about as wide as the width of the dough roll 13 and of a diameter which will permit the latter to pass therebeneath as it is carried forward end on by the belt 11. On both sides of the central section 29 are preferably provided tight roller-surfacing bands 30 and 31 of any suitable material, such as belt webbing or canvas, and the axis of the roller 28 is arranged at a height above the surface of the upward run of the belt 11 a distance permitting frictional contact between the belt surface and the surfaces of the bands 30 and 31. As a result, with the stub shafts 27, 27 mounted for free rotation on the side supporting plates 26, 26, when the upward run of the belt 11 is moved forward traveling from left to right in Figs. 1 and 2, the roller 28 will be rotated in a counterclockwise direction. It will be understood, however, that instead of driving roller 28 in this manner directly from the belt 11, separate means such as pulleys and belts, sprocket and chains, or the like, may be employed which will drive the roller 28 in the proper direction from driving mechanism or the power unit employed to operate other parts of the machine, including the belt 11, or from a separate power source.

Arranged about the reduced midsection 29 of roller 28 are a plurality of curved or arcuately shaped knives or blades 32—32, preferably three in number, laterally spaced apart as shown in Fig. 1, with each extending circumferentially of the cylindrical midsection through a radial angle of about 240°. Each blade has its leading end located about 120° ahead of the leading end of the next adjacent blade. As a result, the three blades or knives 32—32 are arranged in staggered fashion. In the preferred form the blades are obliquely arranged about the slashing roller preferably with the plane of each blade disposed at an angle of about 15° to a plane normal to the roller axis. In addition, each blade or knife is of a depth so that the sharp edge thereof which is arranged on the circumference of a circle is approximately in line with the curved surface of the slashing roller or, more specifically, the outer surfaces of the bands 30 and 31 arranged thereabout.

Beyond the slashing means comprising the roller 28 and knives 32—32 is mounted, preferably by side support plates 26, 26, a picker means adapted to prevent a dough roll when passed beneath the slashing means from sticking or adhering to the knives and, in the rotation of the latter, to be carried up and around with the slashing roller device. Such picker means may comprise a shaft 33 mounted transversely of and above the belt 11, being preferably rotatably supported by the side plates 26, 26. The rotatable shaft 33 has fixed thereto opposite the central portion 29 of the roller 28 and the knives 32—32 a plurality of fingers 34—34 which, in the preferred form, extend radially outwardly from the shaft and with each provided with a nose 35 turned substantially at right angles thereto, and extending away from the direction of rotation to avoid digging into and retaining dough material as shown in Fig. 2. The fingers 34—34 are of such length as to have their noses 35—35 during rotation pass closely adjacent to the paths of the circular cutting edges of the knives 32—32 but with some clearance, preferably at least an eighth of an inch (1/8").

The picker shaft 33 may be rotated in any suitable manner, such as by means of belts and pulleys, sprockets and chains, and the like, from any portion of the machine as desired, or from the power source. Preferably, however, for reasons of simplicity the picker shaft 33 is driven from the slashing roller 28. For this purpose a pulley 36 is fixed to the picker shaft 33 and an endless belt 37 is trained about the pulley and the roller 28. In providing the band 30 on the roller 28, if the former is made of an axial length appreciably shorter than that portion of the roller 28 which is on the same side of the midsection 29 thereof, a section 38 of the roller will be left uncovered by the band 30 and will thus be of less diameter than the compositor roller and band assembly. This permits the belt 37 to be trained about the section 38 of the roller 28 without interfering with the desired contact between the banded portions of the roller and the feed belt 11. Accordingly, the picker shaft 33 will be driven in the same direction, say counter-clockwise as viewed in Fig. 2, as the slashing roller 28, and if the belt 37 is made of the same thickness as the bands 30 and 31, it is believed to be obvious that the belt 37 will also travel in contact with the top surface of the belt 11 beneath the section 38 of the roller. As a result, it may be considered that the picker shaft 33 is driven by the belt 37 directly from the feed belt 11, and also indirectly therefrom through roller 28.

In operation, an elongated roll of dough 13, when it reaches a position such as that depicted at X in full lines in Fig. 1, will be carried forward while being arranged transversely of the upward reach of the belt 11. Eventually that portion 39 of the elongated dough roll 13 which is on the same side of the midpoint 24 of the dough roll and center line of the upward run of the feed belt 11 as the orienting roller 20 will be brought to contact or engagement with the latter, with a greater portion of the dough roll extending on one side of the roller than on the other. Upon further forward movement of the feed belt 11, such as to the right as viewed in Fig. 1, the longer end 40 of the dough roll 13 will be dragged forward by the feed belt and, since the roller 20 is mounted for free rotation, the latter will gradually turn to permit the dough roll to pass it and in doing so orient the dough roll to a position substantially aligned with the path of movement or the center line of the upward run of the belt 11.

In Fig. 1 is shown in dotted lines at Y substantially the position of the dough roll just after contact with the orienting roller 20 and as its longer end 40 is being dragged forward by the belt 11. In that figure the position of the dough roll after further movement forward of the upward reach of the belt 11 is indicated in dot-dash lines at Z, which shows that the longer end 40 of the dough roll, after orientation, is being fed directly to the central portion 29 of the slashing roller 28 and the oblique knives 32—32 carried thereby.

With the elongated dough roll 13 oriented longitudinally of the upward run of the belt 11, it is carried forward end on to beneath the central section 29 of the slashing roll 28 and, as it passes thereunder, the knives 32—32 slash down through the roll, providing a plurality of slashes obliquely along the roll which, due to the preferred arrangement of the knives, will be staggered as indicated in Fig. 3, the slashed elongated dough roll therein being identified by the numeral 41 and the staggered slashes being identified by the numeral 42. Since it is preferred to have the slashes 42—42 extend substantially down through the elongated dough roll 41, the peripheral cutting edges are, as indicated above, located substantially at the same radial distance from the center of the slashing roll 28 as are the cylindrical surfaces of the slashing roll which are in engagement with the top surface of the upward run of the belt 11. The blades 32—32 should be so arranged as to prevent complete transverse severance of the elongated roll 13 and thus as shown in Fig. 3 the slashes 42—42 do not extend completely to the opposite sides of roll 41 but may extend completely down through it from top to bottom. Further, with the blades 32—32 each extending two hundred and forty degrees (240°) they preferably are so staggered as to assure arrangement of slashes 42—42 shown in Fig. 3 whereby a transverse plane at A will intersect one slash and at least substantially meet with an end of each of the two adjacent slashes. In any other transverse plane such as at B two slashes are intersected.

It is believed to be obvious that if slashes of lesser depth are desired, this may be readily accomplished by knives of less radial dimension. Further, although three knives are preferred, a fewer or greater number thereof may be employed, as desired. Additionally, although it is preferred to arrange the knives in staggered formation to produce staggered slashes and to extend the knives about the periphery of that portion of the slashing roller on which they are mounted to the extent indicated above, it is believed to be obvious that other desired variations in relative arrangement of the blades and lengths thereof may be adopted within the scope of the invention.

The elongated dough roll 13, after it is passed beneath the slashing means, comprising the slashing roller 28, by the forward movement of the upward or top run of the belt 11, is carried forward to a delivery point where an operator twists it longitudinally about its axis in the manner indicated above, then curls it to C-shape and pinches the ends together to form a ring. This ring is then baked to produce an edible product which is so similar to that producible by the now common manual operations, a form of which is pictorially shown by way of example in Fig. 4 and identified by the numeral 43, as to resemble the same so closely that visually they cannot be distinguished.

In passage of the elongated dough roll 13 beneath the slashing knives 32—32, there may at times be a tendency for the dough to cling to the knives and the dough roll to be drawn upwardly and around the portion 29 of the slashing roller 28. In order to avoid this difficulty the picker means comprising the fingers 34—34 are rotated adjacent to and opposite the knives in a direction so that the picker fingers are moving downwardly as the knives are moving upwardly in the locality of adjacency. Accordingly, if at any time the dough roll or any portion thereof tends to cling to the knives 32—32 in their upward movement, the picker fingers 34—34 in moving downwardly will push the dough roll off the knives back onto the upward or top run of the belt 11 so that the latter may carry the slashed elongated dough roll 41 forward to its delivery point.

It is to be understood that although the oblique arrangement of the knives or blades 32—32 shown in Fig. 1 is preferred in order to provide the oblique slashes indicated in Fig. 3, the present invention may be practiced by arranging the knives or blades in parallel planes substantially normal to the axis of the slashing roller 28. This will produce slashes along an elongated dough roll which are substantially parallel to each other and the axis of the roll, as shown in Fig. 5. That elongated dough roll 141 is shown provided with a plurality of slashes 142—142, each of which extends along the dough roll substantially parallel to the axis thereof. In such case it is also preferred that the blades be staggered so that the slashes formed will be staggered, such as in the fashion shown in Fig. 5. The resulting product, comprising an elongated slashed roll of dough, may then be handled in the manner proposed above in connection with the product shown in Fig. 3, so as to produce a coffee ring similar to that shown in Fig. 4.

Although the orienting roller 20 has been found to be efficient in orienting or turning a transversely positioned elongated dough roll substantially through an angle of ninety degrees (90°) so as to be arranged longitudinally upon a belt carrying it forward, it has been found that supplementary means may be employed to advantage. Such means are proposed in Fig. 6, wherein a slashing roller 28 is shown to be equipped with a plurality of slashing knives 132—132 which are arranged in planes substantially normal to the axis of the slashing roller in accordance with the modified arrangement of knives proposed above. Obviously, any other blade arrangement, such as that suggested in Fig. 1, may be used. In all other respects the apparatus may be similar to that shown in Figs. 1 and 2 except for the supplementary dough roll orienting means 43 which may comprise a belt pulley or roller 44 fixed upon a driving shaft 45 mounted upon the framework of the machine and driven in any suitable manner, such as from the means used to drive the belt 11. Another pulley 46 may be rotatably supported above the belt 11 in any suitable manner, such as by a shaft 47 mounted in any proper manner upon suitable overhead structure, such as a bracket, similar to that at 14 employed to support orienting roll 20. A belt 48 is trained about the pulleys 44 and 46, and with pulley 44 driven in a clockwise direction, the run of the belt 48 on the approach side will travel toward the blade-carrying, reduced midsection 29 of slashing roller 28.

In operation of the structure shown in Fig. 6, when an elongated dough roll arranged transversely of the belt 11 is carried forward to engage the orienting roller 20, it will assume the dotted line position shown at Y, and at such time its forward end 40 will be engaged by the forwardly traveling run of the orienting belt 48 on the approach side, thereafter to be positively pushed toward the center line of the belt 11 into the dot-dash position shown at Z, with the forward end of the elongated roll being directed toward the slashing knives.

As shown in Fig. 1, the arm 15 which supports the orienting roller 20 may be provided with a longitudinally extending slot, such as that shown at 49, so as adjustably to receive the post 16 whereby the latter and the orienting roller 20 mounted thereon may be moved laterally or transversely of the belt 11 to a variety of positions when the knurled nut 18 is loosened. After lateral adjustment of the roller 20 to a selected position it may be locked in such position by tightening nut 18. Such adjustment will at least permit ready adaptation to elongated dough rolls varying in diameter.

Although a preferred embodiment of the present invention has been devised for efficient employment in connection with the production of edible cinnamon coffee rings, it is obvious that the use thereof, or of modified forms within the scope of the invention, is not limited to such production since doughs of other character or other doughy materials may be handled in part or wholly in similar fashion by apparatus of the present invention.

It will thus be seen that the objects set forth above and those made apparent in the preceding description, among others, are attained in an efficient manner, and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In a dough roll handling machine the combination comprising, transport means to feed an elongated roll of dough end on and carry it forward at a certain linear speed, rotatable roller means mounted a distance above said transport means sufficient to permit the dough roll to pass therebeneath, a plurality of knives mounted on and extending peripherally of and partly around said roller means with said knives being arranged obliquely with respect to the axis of said roller means, and means to rotate said roller means at a speed that will cause said knives to be rotated at a circumferential speed substantially equal to the mentioned linear speed to form a plurality of longitudinally-extending oblique slashes extending along the dough roll as the latter is carried forward beneath said roller means.

2. In a dough roll handling machine the combination comprising, transport means to feed an elongated roll of dough end on and carry it forward at a certain linear speed, rotatable roller means mounted a distance above said transport means sufficient to permit the dough roll to pass therebeneath, a plurality of knives mounted on and extending peripherally of and partly around said roller means with said knives being circumferentially staggered with respect to each other and arranged obliquely with respect to the axis of said roller means, and means to rotate said roller means at a speed that will cause said knives to be rotated at a circumferential speed substantially equal to the mentioned linear speed to form a plurality of longitudinally-extending staggered oblique slashes extending along and substantially through the dough roll as the latter is carried forward beneath said roller means.

3. In a dough roll handling machine the combination comprising, transport means to feed an elongated roll of dough end on and carry it forward at a certain linear speed, rotatable roller means mounted a distance above said transport means sufficient to permit the dough roll to pass therebeneath, a plurality of knives mounted on said roller means with each knife extending peripherally about 240° around said roller means, and means to rotate said roller means at a speed that will cause said knives to be rotated at a circumferential speed substantially equal to the mentioned linear speed to form a plurality of longitudinally-extending slashes along the dough roll as the latter is carried forward beneath said roller means.

4. In a dough roll handling machine the combination comprising, transport means to feed an elongated roll of dough end on and carry it forward at a certain linear speed, rotatable roller means mounted a distance above said transport means sufficient to permit the dough roll to pass therebeneath, a plurality of obliquely arranged knives mounted on said roller means with each knife extending peripherally about 240° around said roller means and circumferentially staggered with respect to each other and means to rotate said roller means at a speed that will cause said knives to be rotated at a circumferential speed substantially equal to the mentioned linear speed to form a plurality of longitudinally-extending staggered oblique slashes along the dough roll as the latter is carried forward beneath said roller means.

5. In a dough roll handling machine the combination comprising, transport means to feed an elongated roll of dough end on and carry it forward at a certain linear speed, rotatable roller means mounted a distance above said transport means sufficient to permit the roll to pass therebeneath, a plurality of knives mounted on said roller means with each knife extending about 240° peripherally of said roller means, and means to rotate said roller means at a speed that will cause said knives to be rotated at a circumferential speed substantially equal to the mentioned linear speed, said knives being of such radial dimension as to form a plurality of longitudinally spaced-apart slashes extending along and substantially through the dough roll as the latter is carried forward beneath said roller means.

6. In a dough roll handling machine the combination comprising, transport means to feed an elongated roll of dough end on and carry it forward at a certain linear speed, rotatable roller means mounted a distance above said transport means sufficient to permit the roll to pass therebeneath, a plurality of curved knives arranged in separate parallel planes all substantially normal to the axis of said roller means and circumferentially staggered with respect to each other, said knives being mounted on said roller means with each knife extending about 240° peripherally of said roller means, and means to rotate said roller means at a speed that will cause said knives to be rotated at a circumferential speed substantially equal to the mentioned linear speed, said knives being of such radial dimension as to form a plurality of longitudinally spaced-apart staggered slashes extending along and substantially through the dough roll as the latter is carried forward beneath said roller means.

7. In a dough handling machine the combination comprising, an endless belt having a run adapted to feed an elongated roll of dough end on and carry it forward, rotatable roller means mounted above said belt run with the cylindrical surface of a portion thereof in contact with said belt whereby the latter may drive the former, said roller means having another portion of smaller diameter with its cylindrical surface spaced a distance above said belt run sufficient to permit the dough roll to pass therebeneath, and a plurality of knives mounted on and extending peripherally of and partly around said smaller portion of said roller means to form slashes along the dough roll as the latter is carried forward by said belt run.

8. In a dough handling machine the combination comprising, an endless belt having a run adapted to feed an elongated roll of dough end on and carry it forward, rotatable roller means mounted above said belt run with the cylindrical surface of a portion thereof in contact with said belt whereby the latter may drive the former, said roller means having another portion of smaller diameter with its cylindrical surface spaced a distance above said belt run sufficient to permit the dough roll to pass therebeneath, and a plurality of knives mounted on and extending peripherally of and partly around said smaller portion of said roller means with the major portions of the cutting edges of said blades being substantially aligned with the cylindrical surface of the larger portion of said roller means to form slashes extending along and substantially through the dough roll as the latter is carried forward by said belt run.

9. In a dough handling machine the combination comprising, an endless belt having a run adapted to feed an elongated roll of dough end on and carry it forward, rotatable roller means mounted above said belt run with the cylindrical surface of a portion thereof in contact with said belt whereby the latter may drive the former, said roller means having another portion of smaller diameter with its cylindrical surface spaced a distance above said belt run sufficient to permit the dough roll to pass therebeneath, and a plurality of staggered obliquely arranged knives mounted on and extending peripherally of and partly around said smaller portion of said roller means with the major portions of the cutting edges of said blades being substantially aligned with the cylindrical surface of the larger portion of said roller means to form staggered oblique slashes extending along and substantially through the dough roll as the latter is carried forward by said belt run.

10. In a dough handling machine the combination comprising, an endless belt having a run adapted to feed an elongated roll of dough end on and carry it forward, rotatable roller means mounted above said belt run with the cylindrical surface of a portion thereof in contact with said belt whereby the latter may drive the former, said roller means having another portion of smaller diameter with its cylindrical surface spaced a distance above said belt run sufficient to permit the dough roll to pass therebeneath, and a plurality of staggered curved knives arranged in separate parallel planes all substantially normal to the axis of said roller means, each of said knives being mounted on and extending about 240° peripherally of said roller means with the major portions of the cutting edges being substantially aligned with the cylindrical surface of the larger portion of said roller means to form staggered slashes extending along and substantially through the dough roll as the latter is carried forward by said belt run.

11. In a dough roll handling machine the combination comprising, means to feed an elongated roll of dough end on and carry it forward, rotatable roller means mounted a distance above said means sufficient to permit the dough roll to pass therebeneath, a plurality of knives mounted on and extending peripherally of and partly around said roller means to form slashes along the dough roll as the latter is carried forward beneath said roller means, rotatable picker means mounted above said feed means and arranged beyond said knives, and means to rotate said picker means in the direction of rotation of said knives to prevent the dough roll from clinging to and being rotated around with said knives.

12. In a dough roll handling machine the combination comprising, means to feed an elongated roll of dough end on and carry it forward, rotatable roller means mounted a distance above said means sufficient to permit the roll to pass therebeneath, a plurality of knives mounted on said roller means with each knife extending about 240° peripherally of said roller means and being of such radial dimension as to form slashes extending along and substantially through the dough roll as the latter is carried forward beneath said roller means, rotatable picker means mounted above said feed means and arranged beyond said knives, and means to rotate said picker means in the direction of rotation of said knives to prevent the dough roll from clinging to and being rotated around with said knives.

13. In a dough handling machine the combination comprising, an endless belt having a run adapted to feed an elongated roll of dough end on and carry it forward, rotatable roller means mounted above said belt run with the cylindrical surface of a portion thereof in contact with said belt whereby the latter may drive the former, said roller means having another portion of smaller diameter with its cylindrical surface spaced a distance above said belt run sufficient to permit the dough roll to pass therebeneath, a plurality of staggered curved knives arranged substantially parallel to each other and obliquely with respect to the axis of said roller means, each of said knives being mounted on and extending about 240° peripherally of said roller means with the major portions of the cutting edges being substantially aligned with the cylindrical surface of the larger portion of said roller means to form staggered oblique slashes extending along and substantially through the dough roll as the latter is carried forward by said belt run, rotatable picker means mounted above said belt run and arranged beyond said knives, and means to rotate said picker means in the direction of rotation of said knives to prevent the dough roll from clinging to and being rotated around with said knives.

14. In a dough roll handling machine the combination comprising, transport means to move forward along a laterally-extending path an elongated roll of dough when arranged thereon to extend substantially transversely of the direction of forward motion, a roller mounted above said transport means in the path of the dough roll with its axis extending upwardly substantially normal to that path, a laterally-extending flange on the bottom end of said roller located relatively close to the path, and means supporting said roller for free rotation about its axis and to one side of the center of the path of dough roll movement so as to assure a greater length of dough roll to one side of the point of engagement thereof with said roller than to the other side thereof so that the dough roll will when moved forward along the path be caused to climb up onto said roller flange and be dragged around said roller by said transport means to be oriented to substantial parallelism with the direction of motion for end on movement.

15. In a dough roll handling machine the combination comprising, an endless belt having a top run to move forward along a laterally-extending path an elongated roll of dough when arranged thereon to extend substantially transversely of the direction of forward motion, a roller mounted above said endless belt in the path of the dough roll with its axis extending upwardly substantially normal to the upward run of said belt, a laterally-extending flange on the bottom end of said roller located relatively close to the path, and means supporting said roller for free rotation about its axis and to one side of the center of the path of dough roll movement so as to assure a greater length of dough roll to one side of the point of engagement thereof with said roller than to the other side thereof so that the dough roll will when moved forward along the path be caused to climb up onto said roller flange and be dragged around said roller by said endless belt to be oriented to substantial parallelism with the direction of motion for end on movement.

16. In a dough handling machine the combination comprising, an endless belt having a top substantially horizontal run, means to position an elongated roll of dough on said upward run with its axis extending substantially transversely of said belt, an orienting roller mounted above said run in the path of said roll and to one side of the path of the midde of said roll when carried forward by said run to cause said roll to be oriented for longitudinal end on forward movement, a laterally-extending flange on the bottom end of said roller located relatively close to the top run of said belt with the top surface of said flange curved upwardly to smooth mergence with the surface of said roller, and means supporting said roller for free rotation about its axis with the latter arranged substantially normal to the surface of said run.

17. In a dough handling machine the combination comprising, an endless belt having a top substantially horizontal run, means to position an elongated roll of dough on said upward run with its axis extending substantially transversely of said belt, an orienting roller mounted above said run in the path of said roll and to one side of the path of the middle of said roll when carried forward by said run to cause said roll to be oriented for end on forward movement, means supporting said roller for free rotation about its axis with the latter arranged substantially normal to the surface of said run, and rotatable slashing means mounted above said run to receive said roll therebeneath after orientation to end on position and to form slashes along said roll as the latter is carried beneath said slashing means by said belt.

18. In a dough handling machine the combination comprising, an endless belt having an upward substantially horizontal run, means to position an elongated roll of dough on said upward run with its axis extending substantially transversely of said belt, an orienting roller mounted above said run in the path of said roll and to one side of the path of the middle of said roll when carried forward by said run to cause said roll to be oriented for end on forward movement, means supporting said roller for free rotation about its axis with the latter arranged substantially normal to the surface of said run, and a plurality of rotatable staggered curved knives mounted above said run to receive said roll therebeneath after orientation to end on position and to form a plurality of staggered slashes along said roll as the latter is carried beneath said rotatable knives by said belt.

19. In a dough roll handling machine the combination comprising, means to carry forward an elongated roll of dough when arranged thereon to extend substantially transversely of the direction of forward motion, an orienting roller mounted above said means in the path of the dough roll with its axis located substantially normal to that path, means supporting said roller for free rotation about its axis and to one side of the center of the path of dough roll movement so as to assure a greater length of dough roll to one side of the point of engagement thereof with said roller than to the other side thereof so that the dough roll will be dragged around said roller by said roll moving means to be oriented to substantial parallelism with the direction of motion for end on movement, and a cross-belt arranged above said roll-carying means to have its run on the approach side moved toward the central portion of said roll-carrying means to assist said orienting roller in its action.

20. In a dough roll handling machine the combination comprising, laterally-extending transport means to carry forward an elongated roll of dough of appreciable diameter in end on position, means to drive said transport means at a certain linear speed, rotatable roller means mounted above said transport means with its axis extending transversely of the latter, means rotatably supporting said roller means at a substantial fixed distance above said transport means sufficient to permit the dough roll to pass freely therebeneath, a plurality of axially-spaced knives mounted on and extending radially outward, peripherally of and only partly around said roller means to slash longitudinally down into the dough roll as the latter is carried therebeneath, said knives having their leading and trailing ends transversely staggered with respect to each other so that the slashes will be transversely staggered in overlapping relation longitudinally of the dough roll, and means to rotate said roller means at a speed which causes said knives to be rotated at a circumferential speed substantially equal to the mentioned linear speed to form the staggered longitudinally-extending slashes in the dough roll as it is moved therebeneath at substantially the same speed whereby the slashes formed by any one knife are discontinuous, the arrangement of said knives being of a pattern which avoids connection of slashes made by any one knife with the slashes made by any other knife.

HARRY W. MAULL.
JOSEPH H. SAUTER.

REFERENCES CITED

The following references are of record in the file of this patent:

UNITED STATES PATENTS

| Number | Name | Date |
| --- | --- | --- |
| 614,338 | Perky | Nov. 15, 1898 |
| 883,370 | Wood | Mar. 31, 1908 |
| 1,176,648 | Callow et al. | Mar. 21, 1916 |
| 1,402,923 | Dempsey | Jan. 10, 1922 |
| 1,565,887 | Andrus | Dec. 15, 1925 |
| 2,104,205 | Menapace et al. | Jan. 4, 1938 |
| 2,232,832 | Walborn | Feb. 25, 1941 |
| 2,349,829 | Nydegger et al. | May 30, 1944 |